US000001280H

United States Statutory Invention Registration [19]

[11] Reg. Number: H1280

Tolstoy

[43] Published: Jan. 4, 1994

[54] LINEARIZATION OF THE MATCHED FIELD PROCESSING APPROACH TO INVERSE TOMOGRAPHY

[75] Inventor: Alexandra Tolstoy, 8610 Battailles Ct., Annandale, Va. 22003

[73] Assignee: United States of America, Washington, D.C.

[21] Appl. No.: 29,809

[22] Filed: Mar. 4, 1993

[51] Int. Cl.[5] ..... G01W 1/00; G01S 13/95

[52] U.S. Cl. ..... 364/420; 181/139; 367/117

[58] Field of Search ..... 364/420; 367/6, 117; 73/597, 602; 181/139

*Primary Examiner*—Bernarr E. Gregory
*Attorney, Agent, or Firm*—Thomas E. McDonnell; Daniel Kalish

[57] ABSTRACT

To determine the speed of propagation of a signal in a medium, signals with known harmonic components are transmitted from one or more sources within the region. One or more detectors within the region measure wave amplitude over time at so as to detect the signals transmitted at the sources and so as to identify the source from which each detected signal was transmitted. Beta bar coefficients are calculated so as to maximize the correlation of the calculated matched field processing power and the measured matched field processing power for each source-detector combination. Beta coefficients for all cells through which a path from a source to a detector passes are calculated by representing all positions in the region by cell number i and position coordinate z, the region being partitioned into M discrete, indexed cells $C_i$; expressing the wave speed as a known function w of the beta coefficients; and calculating the beta coefficients based on the beta bar coefficients, on the path lengths between each source and each detector combination, and on the lengths of those paths passing through each cell. The wave speed is then calculated by using the function w and the beta coefficients.

8 Claims, 8 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

-1 1

| | | | | | | | | | | | | | |
|---|---|---|---|---|---|---|---|---|---|---|---|---|---|
| -G | -F | -E | -D | -C | -B | -A | A | B | C | D | E | F | G |

RANGE (km)

| XRANGE (km) | 0 | 50 | 100 | 150 | 200 | 250 |
|---|---|---|---|---|---|---|
| 250 | F | C | A | A | -A | -A | -A | A | B | F |
| 200 | C | A | -A | -B | -B | -B | -B | -B | -A | B |
| | A | -A | -B | -C | -D | -D | -D | -C | -B | A |
| 150 | A | -B | -C | -D | -E | -F | -E | -D | -B | -A |
| | -A | -B | -C | -E | -F | -F | -F | -D | -B | -A |
| 100 | -A | -B | -C | -E | -F | -F | -E | -D | -B | -A |
| | A | -B | -C | -D | -E | -E | -D | -C | -B | A |
| 50 | A | -A | -B | -C | -C | -C | -C | -B | -A | A |
| | C | A | -A | -B | -B | -B | -B | -A | A | C |
| 0 | F | C | A | A | -A | -A | A | A | C | F |

FIG. 8(a)

RANGE (km)

| XRANGE (km) | 0 | 50 | 100 | 150 | 200 | 250 |
|---|---|---|---|---|---|---|
| 250 | A | -A | -A | -A | -A | A | B | B | B | A |
| 200 | -A | -A | -B | -B | A | C | D | D | C | B |
| | -A | -B | -C | -C | A | D | G | G | D | B |
| 150 | -A | -C | -D | -E | -A | C | F | G | D | B |
| | -A | -C | -E | -E | -D | A | C | D | C | A |
| 100 | -A | -C | -E | -F | -F | -D | -A | A | A | -A |
| | -A | -C | -D | -E | -F | -E | -E | -C | -B | -A |
| 50 | -A | -B | -C | -D | -E | -E | -D | -C | -B | -A |
| | -A | -A | -B | -C | -C | -C | -C | -B | -A | -A |
| 0 | A | -A | -A | -A | -A | -A | -A | -A | -A | A |

FIG. 8(b)

RANGE (km)

| XRANGE (km) | 0 | 50 | 100 | 150 | 200 | 250 |
|---|---|---|---|---|---|---|
| 250 | F | C | A | A | -A | -A | -A | A | B | F |
| 200 | C | A | -A | -B | -B | -B | -B | -B | -A | B |
| | A | -A | -B | -C | -D | -D | -D | -C | -B | A |
| 150 | A | -B | -C | -D | -E | -F | -E | -D | -B | -A |
| | -A | -B | -C | -E | -F | -F | -F | -D | -B | -A |
| 100 | -A | -B | -C | -E | -F | -F | -E | -D | -B | -A |
| | A | -B | -C | -D | -E | -E | -D | -C | -B | A |
| 50 | A | -A | -B | -C | -C | -C | -C | -B | -A | A |
| | C | A | -A | -B | -B | -B | -B | -A | A | C |
| 0 | F | C | A | A | -A | -A | A | A | C | F |

FIG. 8(c)

RANGE (km)

| XRANGE (km) | 0 | 50 | 100 | 150 | 200 | 250 |
|---|---|---|---|---|---|---|
| 250 | A | -A | -A | -A | -A | A | B | B | B | A |
| 200 | -A | -A | -B | -B | A | C | D | D | C | B |
| | -A | -B | -C | -C | A | D | G | G | D | B |
| 150 | -A | -C | -D | -E | -A | C | F | G | D | B |
| | -A | -C | -E | -E | -D | A | C | D | C | A |
| 100 | -A | -C | -E | -F | -F | -D | -A | A | A | -A |
| | -A | -C | -D | -E | -F | -E | -E | -C | -B | -A |
| 50 | -A | -B | -C | -D | -E | -E | -D | -C | -B | -A |
| | -A | -A | -B | -C | -C | -C | -C | -B | -A | -A |
| 0 | A | -A | -A | -A | -A | -A | -A | -A | -A | A |

FIG. 8(d)

RANGE (km)

| XRANGE (km) | 0 | 50 | 100 | 150 | 200 | 250 |
|---|---|---|---|---|---|---|
| 250 | F | C | A | A | -A | -A |
| 200 | C | A | -A | -B | -B | -B |
| 150 | A | -A | -B | -C | -D | -D |
| 100 | A | -B | -C | -D | -E | -F |
| 50 | -A | -B | -C | -E | -F | -F |
| 0 | -A | -B | -C | -E | -F | -F |

| XRANGE (km) | 0 | 50 | 100 | 150 | 200 | 250 |
|---|---|---|---|---|---|---|
| 250 | -A | -A | -B | -B | -B | -B |
| 200 | A | -A | -B | -C | -D | -D |
| 150 | A | -B | -C | -D | -E | -E |
| 100 | A | -A | -B | -C | -C | -C |
| 50 | C | A | -A | -B | -B | -B |
| 0 | F | C | A | A | -A | -A |

| XRANGE (km) | 0 | 50 | 100 | 150 | 200 | 250 |
|---|---|---|---|---|---|---|
| 250 | A | -A | -A | -A | A | B |
| 200 | -A | -A | -B | -B | -B | -B |
| 150 | -A | -B | -C | -D | -D | -D |
| 100 | -A | -C | -D | -E | -E | -E |
| 50 | -A | -C | -D | -E | -F | -F |
| 0 | -A | -C | -D | -E | -F | -F |

| XRANGE (km) | 0 | 50 | 100 | 150 | 200 | 250 |
|---|---|---|---|---|---|---|
| 250 | A | -A | -A | -A | A | B |
| 200 | -A | -A | -B | -B | A | B |
| 150 | -A | -B | -B | -C | A | E |
| 100 | -A | -C | -D | -E | -A | C |
| 50 | -A | -C | -D | -E | -D | A |
| 0 | -A | -C | -E | -F | -F | -D |

FIG. 8(e)

FIG. 8(f)

LINEARIZATION OF THE MATCHED FIELD PROCESSING APPROACH TO INVERSE TOMOGRAPHY

CROSS-REFERENCE TO RELATED APPLICATIONS

This application is related to commonly assigned, U.S. Application Ser. No. 07/764,747, filed on Sep. 24, 1991 by Alexandra Tolstoy, Orest Diachok, and L. Neil Frazer and entitled "Inverse Tomography by Matched Field Processing," which application is incorporated herein by reference.

FIELD OF THE INVENTION

The present invention relates to systems and methods for determining the wave speed of a medium and more particularly to an inverse tomographic technique therefor.

DESCRIPTION OF THE RELATED ART

The term tomography generally denotes the cross-sectional imaging of an object from either transmission or reflected data collected by illuminating the object from several different directions. Inverse tomography involves transmitting signals through a medium and inferring the wave speed in the medium by examining detected signals.

The ocean has been extensively studied and mapped. However, most studies depend on knowledge of the actual sound speed in the ocean. Therefore, it is critical to have accurate knowledge of the sound speed of a region under consideration, so that knowledge of the structure of the region may also be accurate. The accuracy of sonar depends on having accurate knowledge about the ocean water sound speed. Knowledge of geological formations depends on measurements based on accurate knowledge of wave speed.

Techniques utilized in the past have shown that remote sensing of ocean mesoscale structures is highly effective at ranges up to 1000 kilometers (km) using high frequencies (above 100 Hertz (Hz)) where sound-speed structure is inverted (that is, determined) through comparison of measured with predicted times of arrival of rays/multipaths transmitted from a pulsed source and propagating to a detector. These approaches use either moored transmitter/detectors, or moving transmitter/detectors and involve computation in the time domain. In other words, these approaches involve calculation of the elapsed time between emission and receipt of signals. The detectors, whether moored or moving, are vertical hydrophone arrays, thus having multiple sensors.

The moored tomography technique requires resolution on the order of 10 milliseconds (msec) to detect the effects of environmental changes, and this demands broadband coded source signals with accurate synchronization of transmission and recordings. The data must be collected over long periods of time to counter fluctuations due to internal waves, tides, movement of fish and other material in the medium, and other environmental conditions. The location of the sources and detectors must be known precisely. The moored approach suffers from a sparsity of transmitters and detectors since deploying them is expensive. On the other hand, moving the transmitters and detectors, usually by ship, is time consuming and costly.

It would be desirable to use a number of fast, inexpensive air deployed explosives with high signal to noise ratio at the sources. However, these sources cannot be used with the above techniques because they do not provide precisely known times and locations, nor do they provide precisely known waveforms for the signals transmitted.

It would also be desirable to perform the calculations in the frequency domain with low frequencies, thus minimizing the sensitivity to environmental fluctuations and eliminating the necessity of knowing the precise locations for the sources and detectors, since the accuracy needed would depend on the wavelength, which would be longer. However, the above techniques use the time domain and require frequencies above 100 Hz.

U.S. Pat. No. 4,995,001 to John L. Spiesberger discloses a method for determining, inter alia, the speed of propagation of a signal in a medium. The method of Spiesberger uses calculations in the time domain and uses moored transmissions. As with the above methods for use in ocean mesoscale structural determination, it provides relatively inaccurate results or requires the use of accurate data.

Matched field processing, examples of which include Capon processing, maximum likelihood, minimum variance, linear processing, and maximum entropy, has been used to locate sources. It involves cross-correlating, that is, comparing or matching actual measured data from signals, with theoretical predictions of the measured data, based on acoustic fields according to a particular propagation model, to obtain matched field processing power. Further explanation and details of matched field processing power are found in Bucker, H. P. (1976), "Use of Calculated Sound Fields and Matched-Field Detection to Locate Sound Sources in Shallow Water," J. Acoust. Soc. Am. 59, 368–373; Fizell, R. G., "Application of High-Resolution Processing to Range and Depth Estimation Using Ambiguity Function Methods," J. Acoust. Soc. Am. 82, 606–613, which are incorporated herein by reference. Matched field processing of interest herein is in the frequency domain.

The ocean is known to have sound speed profiles. In other words, it is known that the sound speed varies with depth because of factors such as temperature, pressure and salinity. FIG. 1 shows an example of a sound speed profile. However, the sound speed profile might vary with range. Accordingly, the region under consideration is partitioned into a discrete set of cells so that the sound speed profile can be determined at each cell.

Because the maximum sound speed is generally higher on the surface and in deep water, sound speed typically reaches a minimum at depths of about 500–1000 meters (m), sound propagated horizontally will generally refract vertically and reflect from the surface, as shown in FIG. 2.

In order to reduce the parameter search space for determining the sound speed profile in each cell, wave speeds can be represented by a linear combination of known linearly independent functions. In other words, $$v(x,y,z) = v_{mean}(z) + \sum_{j=1}^{J} a_j(x,y) f_j(z). \quad (1)$$

For empirical orthogonal functions (E.O.F.s), the functions $f_1$ are eigenfunctions of a particular known covariance matrix. Since the functions $f_i$ are readily determined from air-deployed expendable bathythermograph data (A.X.B.T.), conductivity, temperature and depth (C.T.D.), or archival data, the problem of determining sound speed profiles which best match the measured data reduces to finding the coefficients $\alpha_j$ for all cells and all values of j, which coefficient values maximize the matched field processing power. However, with this linear representation of wave speed (Eqn. 1), it is very cumbersome and inefficient to calculate the predicted acoustic fields, on which calculation of the matched field processing power is based.

Even if an efficient method of calculating the predicted acoustic fields and therefore matched field processing power were found, the problem of solving for coefficients which maximize the matched field processing power remains. Calculations using standard numerical schemes, including simulated annealing, are prohibitively time consuming. Even medical tomography backpropagation techniques, which involve considering many paths through a cell of interest, and weighting the paths equally, lead to inaccurate results.

The technique disclosed in U.S. Application Ser. No. 07/764,747 (Tolstoy), involves interference patterns across detectors for a single frequency modeled by normal mode methods with range-dependent behavior treated by adiabatic assumption. The essence of that approach is to find the family of profiles for the front or eddy that maximizes the matched field power at the known source locations, as seen at the detectors. The region under investigation is gridded into a finite number of cells. Since the environment is further characterized by means of modified empirical orthogonal functions (M.E.0.F.s), this results in each sound-speed profile (one per grid cell $C_i$) being described in terms of beta coefficients $\beta_j^i$. In the preferred embodiment of that invention, the beta coefficients are determined by the technique of "Beta Backpropagation" so as to maximize the matched field power. For some conditions, that Beta Backpropagation technique is more inaccurate and computationally intensive that the technique of the present invention.

SUMMARY OF THE INVENTION

Accordingly, it is an object of this invention to determine the speed of propagation (wave speed) of a signal through a medium at all positions within a region of the medium by using a small number of sources and detectors whose locations need not be accurately known, and by using signals whose time of transmission and whose waveforms need not be accurately known.

A further object of this invention is to determine wave speed by a method which is not effected by minor environmental disturbances.

A further object of this invention is to determine wave speed by using frequency domain matched field processing.

A further object of this invention is to determine wave speed by efficiently calculating acoustic fields.

A further object of this invention is to determine wave speed by iteratively solving for coefficients which characterize the region and which maximize the matched field processing power.

A further object of this invention is to determine ocean water sound-speed.

Still another object of this invention is to determine ocean water sound-speed by using a small number of fast, inexpensive, air deployed explosives with high signal to noise ratio, and performing the operation over a brief time period.

These and other objects of the present invention are achieved by transmitting signals from one or more transmitters at discrete locations within the region, and detecting the signals at one or more detectors at discrete locations within the region. The signals may be acoustic, electromagnetic, or of any other type, so long as each signal has a known harmonic component, propagated in the medium, and is associated with the source from which it was transmitted. In a preferred embodiment, the medium is ocean water, and the signals are acoustic signals with a 10–30 Hz frequency component ($20\pi$–$60\pi$ radians (rad)/sec). Each detector measures wave amplitude over time and identifies the source from which each detected signal was transmitted. In the preferred embodiment, the detectors are vertically disposed hydrophone arrays.

The problem of determining wave speed within the region so as to best match transmitted and measured signals with predicted signals is made equivalent to the problem of solving for beta coefficients which maximize the correlation of frequency domain matched field processing power, by partitioning the region into a finite number of cells, each having an identifying cell number, and representing each position in the region by a cell number i and by a depth z. The wave speed at each position is expressed as a known function w of a plurality of unknown beta coefficients each identified with the cell number, and of the depth. In other words, $v_i(z)=w(\beta_1^i, \beta_2^i, \ldots, \beta_N^i, z)$. Once the beta coefficients are determined, then each cell has a wave speed profile—wave speed will vary in the cell as a function of depth.

In a preferred embodiment, matched field processing power is determined in accordance with a normal mode propagation model. The wave speed is characterized as $$v_i(z) = \frac{1}{\sqrt{h(z) + \sum_{j=1}^{N} \beta_j^i \cdot g_j(z)}}, \tag{2}$$

where the functions h and $g_j$, for $1 \leqq j \leqq N$ are readily determined. This characterization provides for efficient determination of the normal mode wave numbers by perturbation. Such perturbation normal mode wave numbers provide efficient determination of the acoustic field for use in the normal mode propagation model to calculate the matched field processing power.

Beta bar coefficients indexed by j, $1 \leqq j \leqq N$, and by source-detector combinations, are independently calculated to maximize the correlation of the matched field processing power as measured and as dependent on the beta bar coefficients. The beta coefficients are then determined from the beta bar coefficients and from the horizontal path lengths between the sources and the detectors.

Once all values of the beta coefficients are determined, then the wave speed is readily calculated as $v_i(Z)=w(\beta_1^i, \beta_2^i, \ldots, \beta_N^i, z)$.

Because this invention uses calculations in the frequency domain, it provides accurate results even when there are a small number of sources and detectors, when their locations are not accurately known, when the times of transmission of the signals are not accurately known, and when their waveforms are not accurately known. It is only necessary to know precisely their frequency component. For example, this invention provides for determination of ocean water sound speed over a mesoscale region (for example, 250 km×250 km×1000 m) by using a small number of fast, inexpensive, air deployed explosives with a high signal to noise ratio and a strong $20\pi$–$60\pi$ rad/sec component, and by using hydrophone arrays as detectors. The procedure is performed over a brief period of time.

It is expected that this invention will provide advantages in all situations, such as medical tomography, in which it is desired to accurately determine the speed of propagation of a signal in a medium.

These together with other objects of the invention, along with the various features of novelty and advantages which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and features, objects and advantages other than those set forth above will become apparent when consideration is given to the following detailed description thereof. Such description makes reference to the annexed drawings wherein:

FIGS. 8 (*a*)–(*f*) illustrate computed modified E.0.F. coefficients.

DETAILED DESCRIPTION OF THE PREFERRED EMBODIMENT

Figure 1:
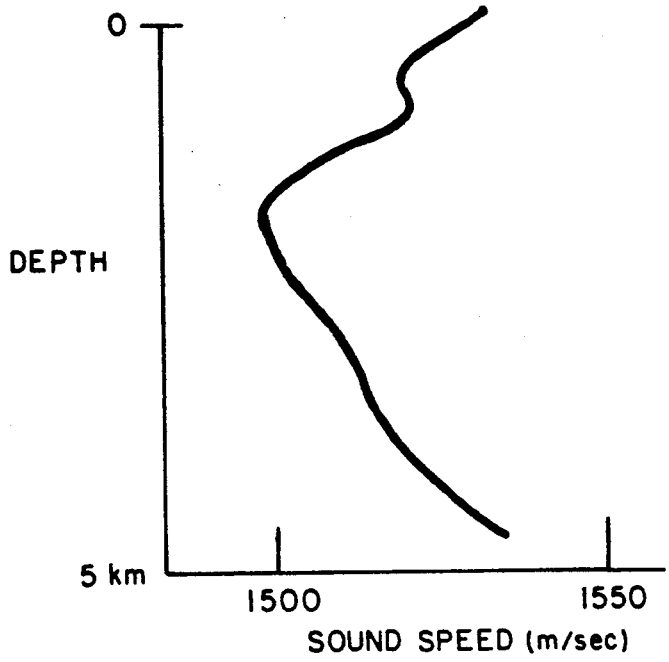
FIG. 1 shows a typical sound speed profile in the ocean.
Figure 2:
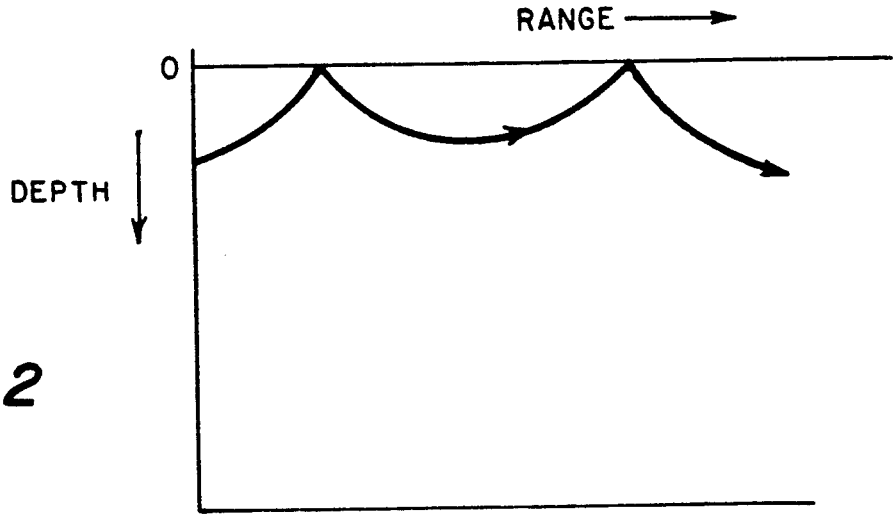
FIG. 2 shows the typical path of a horizontally propagated sound signal in the ocean.
Figure 3A:
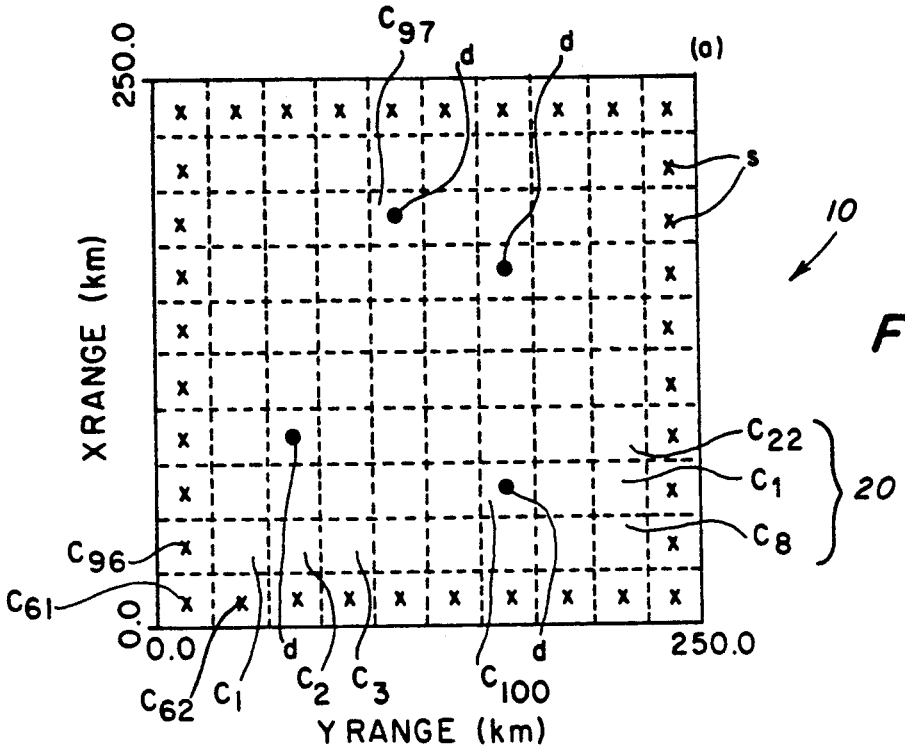
FIGS. 3 (*a*) and (*b*) show a vertical view of the region in the horizonal plane along with the cell partition and the location of sources and detectors as used in the example.
Figure 3B:
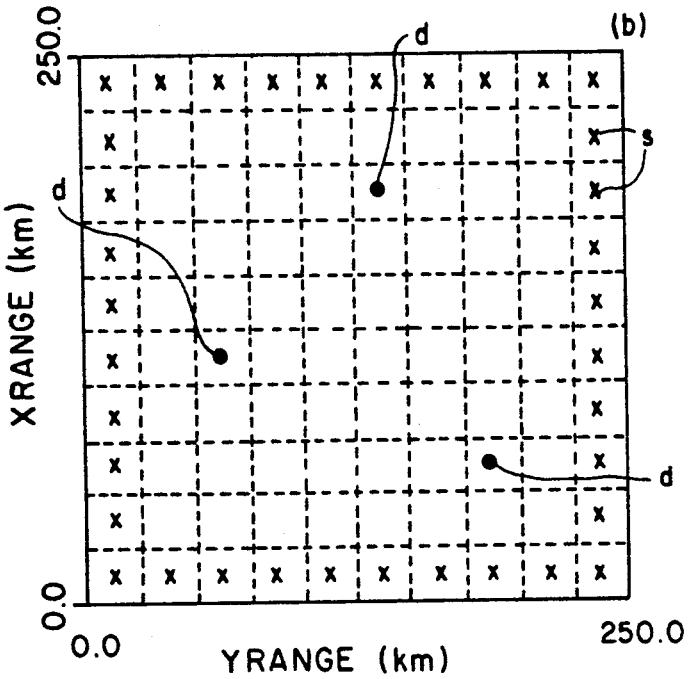
Figure 4:
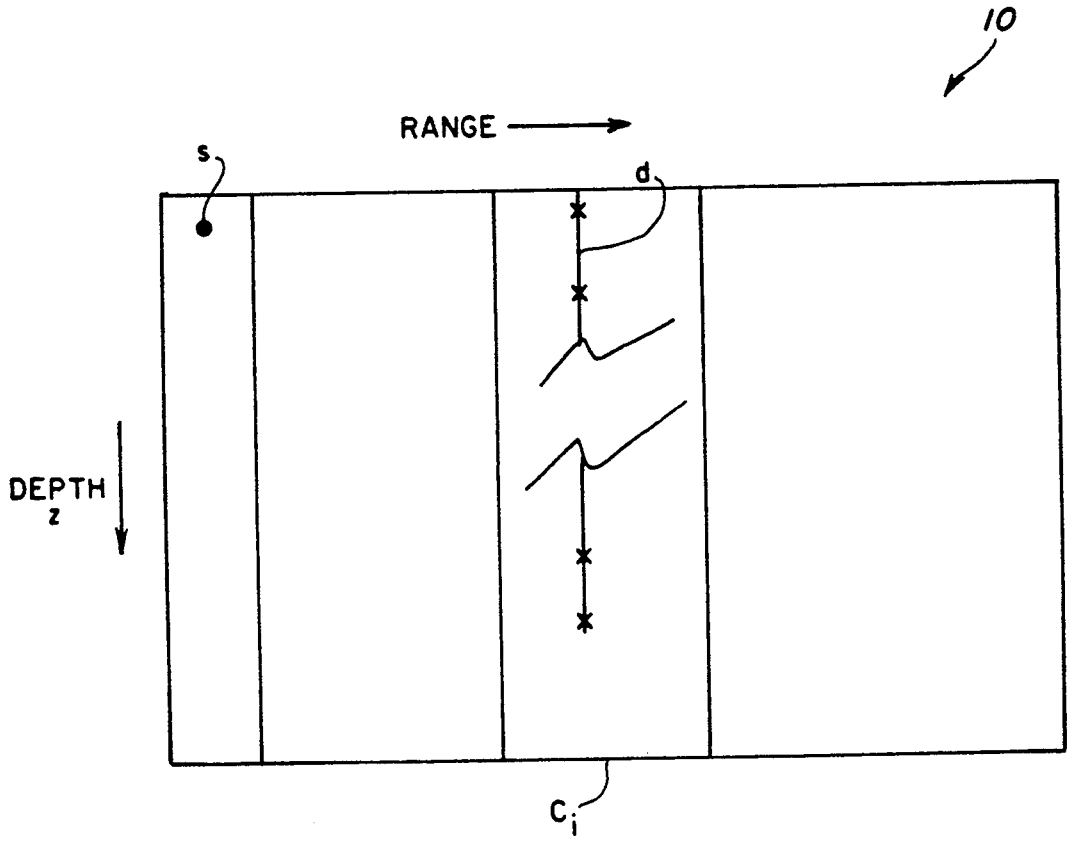
FIG. 4 shows a side view of the region.

Referring now to the drawings, the 3-dimensional mesoscale region (10) of the ocean in which it is desired to determine the speed of propagation of an acoustic signal therethrough (wave speed) is shown in FIGS. 3(*a*), 3(*b*), and 4.

It is desired to study acoustic structures in the ocean over a region which is typically a rectangular solid with a range of 100–1000 km by 100–1000 km, and a depth of 1.00 km. In the example of inverse ocean tomography described in detail herein, the environment simulates a deep water north Pacific region with range 250 km by 250 km and depth 1.00 km.

The signal in question and the propagation medium may be of any type, so long as the signal propagates through the medium. For example, the signal might be of electromagnetic radiation, such as x-rays or light, or it might be acoustic or ultrasonic. The medium might, for example, be an optically transparent solid, a human body, water, or a land mass.

One or more sources (s) and one or more detectors (d) are disposed at discrete locations within the region (10).

Figure 5:
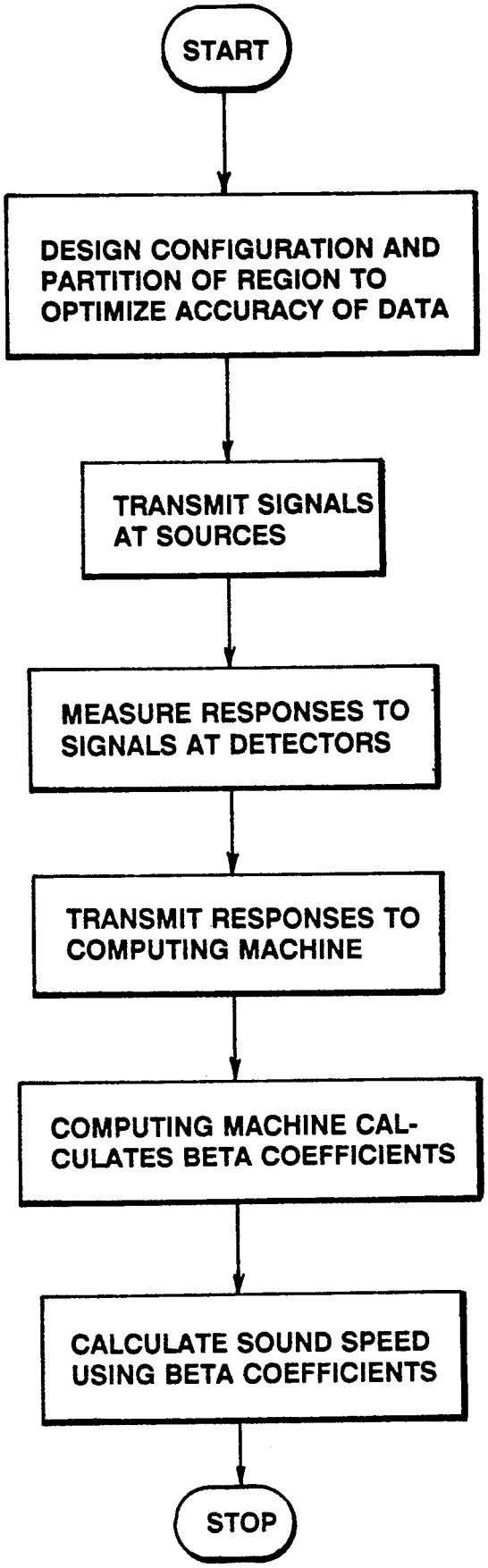
FIG. 5 shows in block diagram form, the overall method for determining sound speed.
Figure 6:
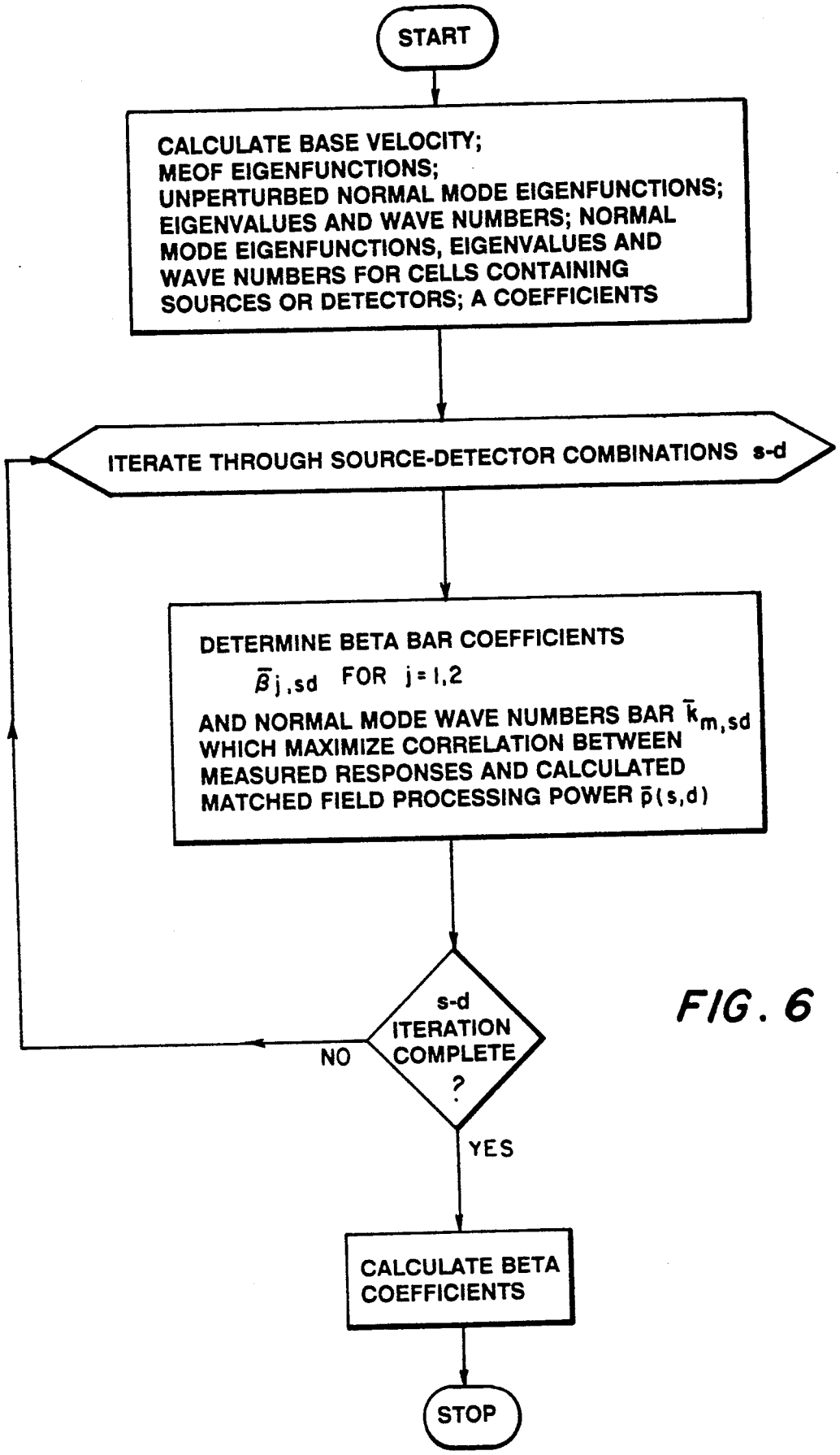
FIG. 6 shows in block diagram form, the method for numerically calculating the beta coefficients for cells that do not contain either a source or a detector.

The method according to the present invention for determining the wave speed is depicted in block diagram representation in Figs. 5, and 6.

Acoustic signals with known harmonic components having angular frequencies $\omega_s$ are transmitted by the sources s. In the preferred embodiment, the harmonic component has angular frequencies $\omega_s$ between $20\pi$ and $60\pi$ rad/sec. In the example herein, 36 air deployed acoustic shots constitute sources equally spaced around the perimeter of the region and 12.5 km from the perimeter, at intervals of 25 km. They explode near the surface. The signals are identified with their transmitting source by order of deployment—the time between deployment of consecutive shots is sufficient to enable distinction of the signals.

In general, the signals from different sources may be distinguished by any means recognizable at the detectors. For example, they may be encoded by pulses or by carrier waves of different frequencies.

The signals transmitted in the example herein all have a $40\pi$ rad/sec component. In other words, $\omega_s 40\pi$ rad/sec for all sources. Such a signal in a medium with a 1500 m/sec. sound speed would have a 75 m wavelength. The results using such a frequency would not be affected by the movement of fish, waves, or by other minor environmental disturbances, which are generally far less than the wavelength. The signals need not be of duration longer than several seconds. Furthermore, imprecise knowledge of the location of sources and detectors of up to about 100 m (about one wavelength or less) do not significantly effect the accuracy of the results herein.

Although this example uses the same frequency for all signals, in general, the invention provides accurate results of signals having different frequency components.

The example herein involves simulating the operation of the invention in a 250 km×250 km×1.00 km medium with known sound speed. It is designed to be an accurate model of a deep water region of the North Pacific ocean. The simulated sound speed at position p=(x,y,z), where $0 \leqq x,y \leqq 250$ km and $0 \leqq z \leqq 1.00$ km is $$v(x,y,z) = v_0(z) + \Delta C_1(x,y,z) + \Delta C_2(x,y,z), \tag{3}$$

where $$\Delta C_w(x,y,z) = \Delta_w \cdot e^{-\left(\frac{r_w}{R_w}\right)^2 - \left[\frac{(z-z_w)}{z_w}\right]^2}, \tag{4}$$

$$r_w = \sqrt{(x - x_w)^2 + (y - y_w)^2}, \tag{5}$$

for w=1 or 2, $\Delta_1 = -10$ m/sec., $\Delta_2 = -5$ m/sec., $(x_1, Y_1) = (125$ km, 125 km), $(x_2, y_2) = (175$ km, 175 km), $R_1 = 100$ km, $R_2 = 50$ km, $z_1 = 500$ m, $z_2 = 200$ m, $Z_1 = 500$ m, and $Z_2 = 200$ m, and for $v_0$ as shown in FIG. 8.

The example involves simulating measurements based on this sound speed equation, and performing calculations based on these simulated measurements.

In this example, 4 or 3 detectors are on the interior of the region, as shown in FIGS. 3(*a*) and 3(*b*), respectively. The detectors are hydrophone arrays, each with 13 phones spaced every 75 m vertically (about every wavelength) with the top phone being about 75 m below the surface. FIGS. 3(*a*) and 3(*b*), respectively, depict the optimal configurations for 4 and 3 detectors. Regardless of location, at least 3 detectors, each of which is an array of hydrophones, are necessary to obtain accurate results for the acoustic structure of an ocean mesoscale region.

In general, the detectors may have any number of individual receivers. Each detector must measure responses, referred to as wave amplitude, over time, in a manner sufficient to distinguish between detected signals transmitted from different sources.

In order to determine the wave speed at every location in the region based on the above data, positions in the region must be spatially represented. This is done, as shown in FIGS. 3(*a*), 3(*b*), and 4, by partitioning the region so that it is represented as a finite set of discrete cells (20) and each of the detectors (d) is in a different cell (20) than all sources (s).

Let M be the number of cells (20). The cells (20) are each identified by a unique positive integer i (cell number) no greater than M. The partition is the set of all cells $C_i$, where $1 \leqq i \leqq M$. Since the cells (20) are discrete, the partition covers the entire region (10), and every position p in the region (10) is in only one cell (20). The partition further involves a spatial coordinate z so that every position p in the region (10) is identified by cell number i and coordinate z.

In this example, the partition involves dividing the region into 100 equal cells of 1.00 km height. Each source and each hydrophone array is in a different cell than all other sources and hydrophone arrays. The cells are numbered 1–100, and, as shown in FIG. 3(*a*), the sources are in cells numbered 61–96, and the detector arrays are in cells numbered 97–100. Partitions with different numbers of cells, different numbers of sources, or different numbers of detectors would be numbered differently. For the configuration shown in FIG. 3(*a*), there are no sources or detectors in cells numbered 1 to 60. The spatial coordinate z represents depth.

Although this example involves a regular, rectilinear partition, the region may in general be partitioned irregularly or, non-rectilinearly, as for example where the spatial coordinate z represents angle or radial distance.

In the preferred embodiment, calculation of the wave speed based on the above data relies on a modified empirical orthogonal function (M.E.0.F.) model by which the wave speed at position p, identified by cell number i and coordinate z, is $$v_i(z) = \frac{1}{\sqrt{h(z) + \sum_{j=1}^{N} \beta_j^i \cdot g_j(z)}}, \tag{6}$$

where $v_i$ is the wave speed in cell $C_i$ as a function of z, $\beta_j^i$ is the $j^{th}$ beta coefficient for cell $C_i$, and h and $g_j$ are known functions of z, for $1 \leqq i \leqq M$ and $1 \leqq j \leqq N$. According to the M.E.O.F. model, the functions $g_j$ and h do not vary from cell to cell. Only the coefficients $\beta_j^i$ vary from cell to cell, as indicated by the index i. The wave speed in cell $C_i$ is characterized as a wave speed profile—it varies as z is varied according to the above equation.

The M.E.0.F. model is based on K sample profiles at L depths each, which sample profiles can come from archival, A.X.B.T., C.T.D. or other similar data. In the embodiment of this example, profiles are sampled at the centers of the 36 cells on the perimeter (K=36) and at 10 depths (L=10).

The L×L matrix M is defined by entries $$M_{ab} = \frac{1}{K} \sum_{k=1}^{K} \left( \frac{1}{v_k^2(z_a)} - \frac{1}{v_{mean}^2(z_a)} \right) \cdot \left( \frac{1}{v_k^2(z_b)} - \frac{1}{v_{mean}^2(z_b)} \right), \tag{7}$$

where the base velocity $v_{mean}$ satisfies $$\frac{1}{v_{mean}^2(z)} = \frac{1}{K} \sum_{k=1}^{K} \frac{1}{v_k^2(z)}. \tag{8}$$

The wave speed satisfies the equation $$\frac{1}{v_i^2(z)} = \frac{1}{v_{mean}^2(z)} + \sum_{j=1}^{L} \beta_j^i \cdot g_j(z). \tag{9}$$

where $g_j$ is the j-th eigenfunction of the matrix M and $v_{mean}$ is defined as above (Eqn. 8). These functions are readily determined by known techniques. In this example, accurate results are obtained by ignoring $g_j$ for j greater than N, where N=2. In other words, the M.E.0.F. expression of sound speed satisfies $$\frac{1}{v_i^2(z)} = h(z) + \sum_{j=1}^{2} \beta_j^i \cdot g_j(z), \tag{10}$$

where $$h(z) = \frac{1}{v_{mean}^2(z)}. \tag{11}$$

Figure 7:
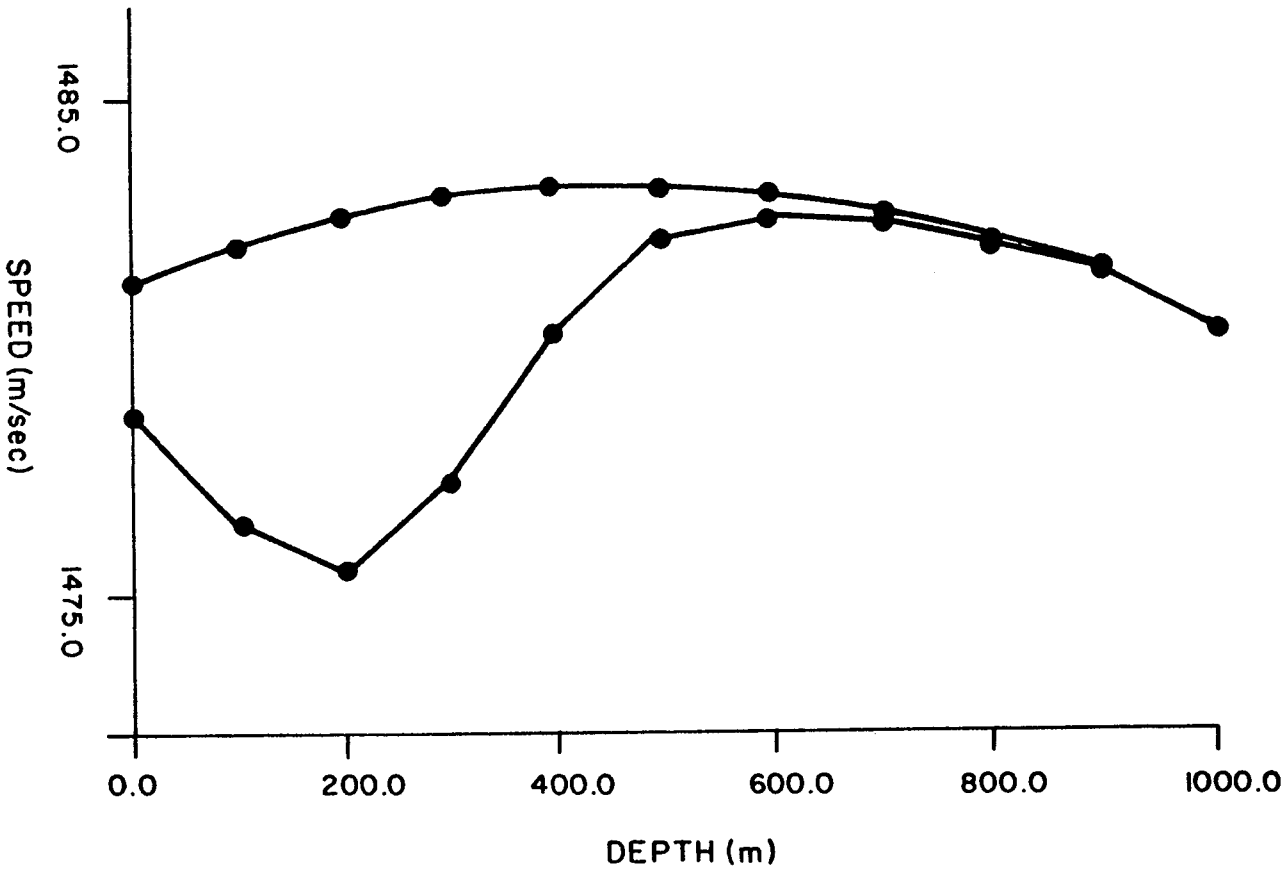
FIG. 7 is a graph of the eigenfunctions $g_1$ and $g_2$ calculated in this example.

Normalized curves for $g_1$ and $g_2$ as determined in this example are shown in FIG. 7.

In general, the functions h and $g_j$ are determined by means known to those skilled in the art. In other words, it is known how the wave speed varies within each cell $C_i$ pursuant to functions h and $g_j$. However, those situations where Eqn. 11 is satisfied are particularly useful for calculating perturbation normal mode wave numbers since the functions $v_i$ and $v_{mean}$ have the property $$\frac{1}{v_i^2(z)} - \frac{1}{v_{mean}^2(z)} = \sum_{j=1}^{N} \beta_j^i \cdot g_j(z). \tag{12}$$

In the more general embodiment, the wave speed at each position is expressed as a known function w of a plurality of unknown beta coefficients each identified with the cell number, and of the depth, that is, $v_i(z) = w(\beta_1^i, \beta_N^i, z)$.

In calculating the beta coefficients, a distinction is made between cells through which some signals pass, and cells through which no signals pass. If the signal transmitted at source s and detected at detector d would theoretically pass through cell $C_i$, then $\Delta_{s,d,i}$ is defined as the horizonal length of the path of this signal (without horizontal refraction) in cell $C_i$. On the other hand, if this signal would not theoretically pass through cell $C_i$, then $\Delta_{s,d,i}$ is defined as 0. The set of cells through which some signed passes is denoted T. In other words, $T=\{C_i$ such that $\Delta_{s,d,i} \neq 0$ some s,d. In the preferred embodiment with 4 detectors (FIG. 3(*a*)), the cells containing sources or detectors are not considered to be in T. In particular, $C_i \in T$ for $1 \leqq i \leqq 60$ and $C_i \notin T$ for $61 \leqq i \leqq 100$.

For those cells $C_i$ through which no signals pass (in other words, $C_i \notin T$), the values of $\beta_j^i$ are determined by means known to persons skilled in the art. Such cells include those cells containing a source or a detector. As an example of calculation, the beta coefficient values for such cells could be determined by using A.X.B.T., C.T.D. or archival data. For all other cells, that is, cells $C_i$ through which some signal passes ($C_i \in T$), then the values of $\beta_j^i$ which maximize the correlation of the matched field processing power are determined as discussed further below.

The next step is to determine the matched field processing power $P_{s,d}$ for signal transmitted at source s and received at detector d so that the beta coefficient which maximizes its correlation can be determined.

The matched field processing power correlation $P_{s,d}$ model used in this example uses the Capon processor (with S/N=10 dB.) and the adiabatic normal mode theory considering only the waterborne modes. This model assumes that bottom interacting energy has been mode filtered out or time gated out. This propagation model used further does not provide for full 3-dimensional effects. In other words, there is no horizontal refraction. The horizontal component of a signal path is a straight line.

In order to use any normal mode propagation model to calculate the acoustic field in the cell, and then calculate the acoustic power through the cell, it is necessary to determine unperturbed eigenvalues $\lambda_{m0}$ and eigenfunctions $\phi_{m0}$ for normal mode m which satisfy the Helmholtz equation $$\frac{\partial^2 \phi_{m0}(z)}{\partial z^2} + \frac{\omega^2}{v_0^2(z)} \cdot \phi_{m0}(z) = 0 \tag{13}$$

where $v_0$ is the sound speed in the unperturbed environment. I.e., $$v_0(z) = \frac{1}{\sqrt{h(z)}} . \tag{14}$$

In the preferred embodiment which uses M.E.0.F. in which Eqn. (11) is satisfied, then $v_0 = v_{mean}$. If L denotes the operator $$\frac{\partial^2}{\partial z^2} \tag{15}$$

and $v_0$ denotes the operator $$V_0(\phi_{m0}(z)) = \frac{\omega^2}{v_0^2(z)} \cdot \phi_{m0}(z), \tag{16}$$

then the unperturbed eigenvalues and eigenfunctions satisfy the equation $$(L+V_0)\phi_{m0} = \lambda_{m0} \cdot \phi_{m0}. \tag{17}$$

The corresponding unperturbed normal modal wave numbers $k_{m0}$ for mode m are then related to the unperturbed normal modal eigenvalues as $$k_{m0} = \sqrt{\lambda_{m0}} . \tag{18}$$

The unperturbed eigenvalues, eigenfunctions, and wave numbers $\lambda_{m0}$, $\phi_{m0}$, and $k_{m0}$, respectively, are uniform in the region since they are based on the unperturbed environment having sound speed $v_0$.

For the perturbed environment with variable sound speed, the eigenvalues and eigenfunctions $\lambda_m^{(i)}$ and $\phi_m^{(i)}$ for normal mode m which satisfy the Helmholtz equation $$(L+V)\phi_m^{(i)} = \lambda_m^{(i)} \cdot \phi_m^{(i)}, \tag{19}$$

where V denotes the operator $$V(\phi_m^{(i)}(z)) = \frac{\omega^2}{v^2(z)} \cdot \phi_m^{(i)}(z), \tag{20}$$

can be calculated directly, for cells which are not in any source-detector path (i.e. cells $C_i \in T$) since the sound speed v in these cells is known. In particular, $\lambda_m^{(s)}$, $\phi_m^{(s)}$, $k_m^{(s)}$, $\lambda_m^{(d)}$, $\phi_m^{(d)}$, $k_m^{(d)}$, are readily calculated.

For cells cell $C_i$ in which the sound speed is not known, the normal modal wave numbers $k_m^{(i)}$ can be calculated by using the perturbation normal mode wave number method. The derivation of this method involves the perturbation operator $$\partial V = \frac{\omega^2}{v^2(z)} - \frac{\omega^2}{v_0^2(z)} . \tag{21}$$

In M.E.0.F., the difference between the inverse of the wave speed (v) squared and the inverse of the mean wave speed ($v_{mean} = v_0$), i.e.

$$\frac{1}{v_i^2(z)} - \frac{1}{v_{mean}^2(z)} , \tag{22}$$

is a linear sum of basis functions h and $g_j$. This difference corresponds to the perturbation operation. Therefore the perturbation normal mode wave number $k_m(i)$ associated with mode m and perturbation cell $C_i$ may be approximated as a normal mode wave number $k_{m0}$ associated with the unperturbed environment ($v = v_{mean} = v_0$) plus a perturbation normal mode wave number $\delta k_m(i)$. In other words, $$k_m^{(i)} = k_{m0} + \delta k_m^{(i)}. \tag{23}$$

The unperturbed normal mode wave numbers $k_{m0}$ need only be calculated once, and the perturbation normal mode wave numbers can be readily calculated. The beta coefficients are related to the perturbation normal mode wave numbers by $$\delta k_m^{(i)} = \omega \cdot \sqrt{\sum_{j=1}^{N} \beta_j^i \cdot A_{j,m}} , \tag{24}$$

where

-continued $$A_{j,m} = \int \phi_{m0}^2(\xi) \cdot g_j(\xi)\, d\xi, \tag{25}$$

over all depth values $\zeta$, where $\phi_{m0}$ and $g_j$ are as defined earlier. The coefficients $A_{j,m}$ need only be calculated once. Therefore, this perturbation normal mode wave number calculation provides efficient determination of the acoustic field. The eigenvalues $\lambda_m^{(i)}$ are related to the wave numbers as $$k_m^{(i)} = \sqrt{\lambda_m^{(i)}}\ . \tag{26}$$

The perturbation normal mode wave numbers $k_m^{(i)}$ need not be calculated. As discussed later, the perturbation normal mode wave number method is used to calculate perturbation normal mode wave number bars $\bar{k}_{m,sd}$.

Coefficients $\beta_j^i$ for $C_i \epsilon T$ and $1 \leqq j \leqq N$ are then calculated (the beta calculation step) so that these values maximize the correlation of $P_{s,d}$ for all combinations of sources s and detector arrays d. This beta calculation is performed in two substeps: first, beta bar coefficients are calculated, and then these beta bar coefficients are used to calculated the beta coefficients.

As noted earlier, the beta coefficients are indexed $\beta_j^i$ for $1 \leqq j \leqq N$ (N=2 in the example discussed herein) and $C_i\ \beta T$. The beta bar coefficients are indexed $\bar{\beta}_{j,sd}$, s being a source index and d being a detector array index. For each source-detector combination s-d, values for beta bar coefficients $\bar{\beta}_{j,sd}$ are calculated which maximize the correlation between the measured and calculated matched field processing power $\bar{p}(s,d)$ as defined below. The following expressions are used in calculating the matched field processing power $\bar{p}(s,d)$:

$$\bar{k}_{m,sd} = k_{m0} + \overline{\delta k}_{m,sd}, \tag{27}$$

where $k_{m0}$ is the unperturbed normal modal wave number for mode m, and the perturbation normal modal wave number bar for mode m is $$\overline{\delta k}_{m,sd} = \omega \cdot \sqrt{\sum_{j=1}^{N} \bar{\beta}_{j,sd} \cdot A_{j,m}}\ . \tag{28}$$

$R_{sd}$ is the horizontal distance between the source s and detector d. The variable $z_s$ is the source depth, and $z_d$ is the detector depth. The function $\phi_m^{(s)}$ is the mode m eigenfunction of the cell containing the source, and $\phi_m^{(d)}$ is the mode m eigenfunction of the cell containing the detector. Using these expressions, $$\bar{p}(s,d) = \sqrt{2\pi} \cdot e^{i\pi/4} \cdot \sum_m \frac{1}{\sqrt{k_{m,sd} \cdot R_{sd}}} \cdot \phi_m^{(s)}(z_s) \cdot \phi_m^{(d)}(z_d) \cdot e^{-ik_{m,sd}R_{sd}}. \tag{29}$$

The beta bar coefficient calculation is performed by means known in the art, such as by global search. The beta bar coefficients for differing source-detector combinations are preferably calculated independently of each other. In the 4-array example herein, N=2, there are 36 sources and 4 detectors, and so 288 (2 * 36 * 4) beta bar coefficients are calculated.

The beta coefficients are related to the beta bar coefficients by the linear system $$\bar{\beta}_{j,sd} \cdot R_{sd} = \sum_i \beta_j^i \cdot \Delta_{s,d,i}, \tag{30}$$

where $\Delta_{s,d,i}$ is the horizontal length of the path from source s to detector d in cell $C_i$ as defined earlier. The linear system (30) is expressed in linear algebra form as the set of equations over all source-detector combinations s-d as $$\bar{y}_j = B \cdot \bar{X}_j, \tag{31}$$

where B is the matrix with elements $\Delta_{s,d,i}$. In the ocean sound speed example discussed here, j=1,2 (N=2), so there are 2 systems of linear equations relating the beta bar coefficients to the beta coefficients.

As long as there are more source-detector combinations than undetermined cells, and as long as matrix B in equation (31) has a strong matrix kernel, then the system of equations (30) is an overdetermined system that can be solved by means of a standard Moore-Penrose generalized inverse or by other means known in the art. More sophisticated approaches, such as stochastic inverses, could also be used to improve the accuracy of beta coefficient calculation, especially if the measured data contain significant errors.

The condition number of matrix B, defined as the maximum absolute value of its eigenvalues divided by the minimum absolute value of its eigenvalues, is indicative of the instability of matrix B. A matrix B with lower condition number gives more accurate inversion and more accurate values of the beta coefficients than a matrix B with larger condition number. The condition number may be determined from the region configuration in terms of location of sources and detectors and in terms of the partition of the region into cells. Accordingly, the configuration and partition of this system is preferably designed, before any signals are transmitted, in order to maximize the condition number of matrix B. Optimal configurations for the example discussed herein, in which the partition is divided into 100 equal cells and the sources are at the outer perimeter of the region, for 4 and 3 array configurations, as shown in FIGS. 3(*a*) and 3(*b*), result in minimal condition numbers. Specifically, the configuration of FIG. 3(*a*) results in condition number of 91., and the configuration of FIG. 39*b*) results in condition number of 378. A high condition number for array B may occur when detector arrays are close together. For matrices B with such high condition numbers, the accuracy of calculations to determine the beta coefficients is improved by adding a small number, such as 0.01 $km^2$, to the diagonal of matrix $B^tB$.

Having determined the beta coefficients, the speed of propagation of a signal through the medium is now readily determinable at any position p in the region. The position is identified by cell number i of the partition and by coordinate z. For the preferred embodiment, the wave speed at position p is then $$v_i(z) = \frac{1}{\sqrt{h(z) + \sum_{j=1}^{N} \beta_j^i \cdot g_j(z)}}. \quad (32)$$

Since the functions h and $g_j$ and all coefficients $\beta_j^i$ are known, the wave speed can be readily calculated.

In general, the wave speed is calculated as $v_i(Z) = w(\beta_1^i, \beta_2^i, \ldots, \beta_N^i, z)$.

The calculations in this example were performed on a Convex mainframe computer, using programs written in the FORTRAN language. The results, expressed in terms of normalized $\beta_1$ and $\beta_2$, are shown in FIG. 8 (*a*)–(*f*). Specifically, FIGS. 8 (*a*) and (*b*), respectively, show the actual values of $B_1$ and $B_2$ (this is a simulated system), FIGS. 8 (*c*) and (*d*), respectively, show the values of $\beta_1$ and $\beta_2$ calculated using the 4-array configuration shown in FIG. 3(*a*), and FIGS. 8 (*e*) and (*f*), respectively, show the values of $\beta_1$ and $\beta_2$ calculated using the 3-array configuration shown in FIG. 3(*b*).

It will be understood that the embodiments described herein are only illustrative of the invention and numerous other arrangements and implementations of the invention may be derived by those skilled in the art without departing from the spirit and scope of the invention.

What is claimed is:

1. A method for determining the wave speed within a region of a medium, comprising the steps of:

(a) transmitting signals from one or more sources disposed within the region, each signal having a known harmonic component:

(b) measuring wave amplitude over time at one or more detectors disposed within the region so as to detect the signals transmitted at the sources and so as to identify the source from which each detected signal was transmitted;

(c) calculating beta bar coefficients so as to maximize the correlation of the calculated matched field processing power and the measured matched field processing power for each source-detector combination;

(d) calculating beta coefficients for all cells through which a path from a source to a detector passes, comprising the steps, (i) representing all positions in the region by cell number i and position coordinate z, the region being partitioned into M discrete, indexed cells $C_i$;

(ii) expressing the wave speed as a known function w of the beta coefficients;

(iii) calculating the beta coefficients based on the beta bar coefficients, on the path lengths between each source and each detector combination, and on the lengths of those paths passing through each cell; and (e) calculating the wave speed by using the function w of part (d)(ii) and the beta coefficients calculated in part (d)(iii).

2. A wave speed determination method according to claim 1 wherein the beta bar calculation step further comprises the steps of calculating perturbation normal mode wave number bars and calculating the beta bar coefficients therefrom.

3. A wave speed determination method according to claim 1 wherein the wave speed characterization step further comprises the steps of characterizing the wave speed in cell $C_i$ as the inverse of the square root of the sum of a function h of depth and the sum over all values of j of the product of the j-th beta coefficient for cell $C_i$ and the function $g_j$ of the depth, and determining the functions h and $g_j$.

4. A wave speed determination method according to claim 1 wherein the signals are acoustic and the medium is ocean water.

5. A wave speed determination method according to claim 4 wherein the angular frequencies of the signals harmonic components are between $20\pi$ radians/sec and $60\pi$ radians/sec.

6. A wave speed determination method according to claim 4 wherein the signals are explosives deployed to generate signals near the surface of the water.

7. A wave speed determination method according to claim 6 wherein the explosives are air-deployed.

8. A wave speed determination method according to claim 1 wherein the locations of the sources and detectors are known to within about one wavelength.

* * * * *